(12) United States Patent
Yuji et al.

(10) Patent No.: US 7,013,733 B2
(45) Date of Patent: Mar. 21, 2006

(54) SILICON RESONANT TYPE PRESSURE SENSOR

(75) Inventors: Arai Yuji, Tokyo (JP); Nishikawa Tadashi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 11/153,665

(22) Filed: Jun. 15, 2005

(65) Prior Publication Data

US 2005/0279175 A1    Dec. 22, 2005

(30) Foreign Application Priority Data

Jun. 17, 2004  (JP)  ............... 2004-179125

(51) Int. Cl.
*G01L 11/00*  (2006.01)
(52) U.S. Cl. ...................................... 73/704
(58) Field of Classification Search ............. 73/704, 73/702, 715–728
See application file for complete search history.

(56) References Cited

U.S. PATENT DOCUMENTS 4,311,053 A * 1/1982 Cucci .......................... 73/704
6,906,395 B1 * 6/2005 Smith ......................... 257/417
6,949,807 B1 * 9/2005 Eskridge et al. ............ 257/415

FOREIGN PATENT DOCUMENTS

JP    4-116748    10/1992

* cited by examiner

*Primary Examiner*—William Oen
(74) *Attorney, Agent, or Firm*—John J. Penny, Jr.; Edwards Angell Palmer & Dodge LLP

(57) ABSTRACT

A silicon resonant type pressure sensor has a sensing diaphragm to which a measuring pressure is to be applied; and a vibrating beam which is embedded on the sensing diaphragm, and which is made of a semiconductor, wherein the vibrating beam further has a vibrating beam body having first and second vibrating beams which are allocated in parallel each other, and at least one connecting beam portion which couples the first vibrating beam and the second vibrating beam, a driving vibrating beam portion which is fabricated on a side of at least one side face in an axial direction of the first and second vibrating beams, and which is made of a conductor, and detection vibrating beam portions which are fabricated on sides of another side face in the axial direction of the first and second vibrating beams respectively, and which are made of a conductor.

9 Claims, 7 Drawing Sheets

SILICON RESONANT TYPE PRESSURE SENSOR

CROSS-REFERENCE TO RELATED APPLICATIONS

This application is based upon and claims the benefit of priority from the prior Japanese Patent Applications No. 2004-179125, filed on Jun. 17, 2004, the entire contents of which are incorporated herein by reference.

BACKGROUND OF THE INVENTION

1. Field of the Invention

The present invention relates to a silicon resonant type pressure sensor in which the output signal can be doubled, and the S/N ratio is enhanced by increasing the signal level.

2. Description of the Related Art

JP-UM-A-4-116748 (pages 4 and 5, FIGS. 4, 6, and 7) is referred to as a related art of a silicon resonant type pressure sensor.

FIG. 8 is a diagram illustrating the configuration of main portions of an example of a related pressure sensor which is usually used. Such a pressure sensor is disclosed in, for example, JP-UM-A-4-116748 entitled "Silicon resonant type pressure measuring apparatus".

FIG. 9 is an enlarged detail view of main portions of FIG. 8, FIG. 10 is an enlarged detail view of the silicon sensor chip of FIG. 9, FIG. 11 is a diagram illustrating the cross-section of a silicon resonator and the operation of FIG. 8, FIG. 12 is a diagram illustrating the operating principle of FIG. 8, and FIG. 13 is a schematic circuit diagram of a silicon resonator of FIG. 12.

In this example, a silicon resonant type pressure sensor is used in a pressure measuring apparatus.

In the figures, the reference numeral 1 is a sensor chip made of a single crystal silicon.

The reference numeral 2 is a sensing diaphragm which is formed by a dint 3 formed in the sensor chip 1, and which detects a measuring pressure Pm.

The reference numeral 4 is a strain detection sensor which is embedded in the sensing diaphragm 2. A silicon resonator is used as the strain detection sensor.

The reference numeral 5 is a shell which is fabricated by a semiconductor epitaxial growth layer for vacuum sealing, and which seals the silicon resonator 4 into the sensing diaphragm 2.

The reference numeral 6 is a vacuum chamber. The silicon resonator 4 is embedded into the vacuum chamber 6 formed in the sensing diaphragm 2.

As shown in FIGS. 11 and 12, the silicon resonator 4 is caused by a magnetic field generated from a permanent magnet 7, and a closed-loop self-excited oscillator circuit connected to the silicon resonator 4, to vibrate at the resonant frequency of the silicon resonator 4.

The permanent magnet 7 is mounted so as to be faced to the silicon resonator 4 via yokes 8, a yoke holder 9, and a spacer 11.

In FIG. 12, a silicon resonator has an H-like shape.

The reference numeral 21 is a metal cap having a U-like cross-section shape in which the yoke holder 9 is clearance-fitted to the side of a bottom portion 22, the bottom portion 22 pushes the yoke holder 9 against the spacer 11 in the direction to the silicon resonator 4, and a support member 12 is clearance-fitted to the side of an opening 23. An opening edge 24 of the metal cap is fixed by welding 25 to the support member 12.

The metal cap 21 is made of a material having a thermal expansion coefficient which is similar to the thermal expansion coefficients of the yoke holder 9 and the support member 12, and therefore accurately sets the relative positions of the silicon resonator 4 and the permanent magnet 7.

The reference numeral 26 is a hole which is formed in a middle area of the bottom portion 22.

In the above configuration, when the measuring pressure Pm is applied to the sensing diaphragm 2, the axial force of the silicon resonator 4 is changed, and the resonant frequency is changed. Therefore, the measuring pressure Pm can be measured in accordance with the change of the resonant frequency.

In this case, a driving current $i_0$ is supplied to the excitation side of the silicon resonator 4 to vibrate the H-shaped resonator 4, and the resonant frequency is detected in accordance with an induced electromagnetic output voltage $e_{out}$ which is generated in the detection side.

As shown in FIG. 13, R1 is the resistance of the silicon resonator 4, and R2 is the resistance of the shell S.

In such an apparatus, the driving current $i_0$ is supplied to the excitation side of the silicon resonator to cause the H-shaped resonator 4 to vibrate. The frequency is detected in accordance with the induced electromagnetic output voltage $e_{out}$ which is generated in the detection side. The input beam is separated from the output beam.

Because of restrictions on the shape of the resonator, the immensity of the magnetic flux density, and the like, the level of the output voltage $e_{out}$ is limited.

Even when the resonator is miniaturized so as to be smaller than that of the related art, the level of the output voltage becomes smaller, and the S/N ratio also become worse, so that the signal detection is hardly conducted. Therefore, it is difficult to miniaturize the resonator size.

In summary, because of restrictions on the shape of the resonator, the magnetic flux density, and the like, the level of the output voltage $e_{out}$ is small.

Since the resonator and the shell portion are not electrically isolated from each other, the driving current $i_0$ flows to the shell.

Since the excitation and detection sides of the resonator are not electrically isolated from each other, the driving current $i_0$ leaks to the detection side, consequently the cross talk level is increased.

As a result, the S/N ratio of the output voltage of the resonator 4 becomes worse.

SUMMARY OF THE INVENTION

The object of the invention is to provide a silicon resonant type pressure sensor in which the output signal can be doubled, the S/N ratio is enhanced by increasing the output signal level, restrictions on use are eliminated, the sensitivity becomes higher, and the dynamic range is wide.

The invention provides a silicon resonant type pressure sensor having: a sensing diaphragm to which a measuring pressure is to be applied; and a vibrating beam which is embedded on the sensing diaphragm, and which is made of a semiconductor, wherein the vibrating beam further has: a vibrating beam body having first and second vibrating beams which are allocated in parallel each other, and at least one connecting beam portion which couples the first vibrating beam and the second vibrating beam; a driving vibrating beam portion which is fabricated on a side of at least one side face in an axial direction of the first and second vibrating beams, and which is made of a conductor; and detection vibrating beam portions which are fabricated on sides of another side face in the axial direction of the first and second vibrating beams respectively, and which are made of a conductor.

In the silicon resonant type pressure sensor, the vibrating beam further has a detection vibrating beam connecting portion which electrically connects one end of one detection vibrating beam portion to one end of another detection vibrating beam portion.

In the silicon resonant type pressure sensor, the detection vibrating beam connecting portion is fabricated in the connecting beam portion.

In the silicon resonant type pressure sensor, the vibrating beam body is made of a silicon material.

In the silicon resonant type pressure sensor, the driving vibrating beam portion is electrically isolated from the detection vibrating beam portions by an isolation layer or a PN junction.

In the silicon resonant type pressure sensor, the driving vibrating beam portion is formed by doped boron or phosphorus into the vibrating beam body.

In the silicon resonant type pressure sensor, the detection vibrating beam portions are formed by doped boron or phosphorus into the vibrating beam body.

In the silicon resonant type pressure sensor, the first and second vibrating beams are vibrated in reversed phase each other.

The invention also provides a vibrating beam having: a vibrating beam body having first and second vibrating beams which are allocated in parallel each other, and at least one connecting beam portion which couples the first vibrating beam and the second vibrating beam; a driving vibrating beam portion which is fabricated on a side of at least one side face in an axial direction of the first and second vibrating beams, and which is made of a conductor; and detection vibrating beam portions which are fabricated on sides of another side face in the axial direction of the first and second vibrating beams respectively, and which are made of a conductor.

According to the silicon resonant type pressure sensor, the detection vibrating beam length can be doubled twice in length as compared to the related art example. Therefore, it is possible to provide a silicon resonant type pressure sensor in which the output signal of a resonator can be doubled.

Since the output signal level can be increased, a silicon resonant type pressure sensor having an improved S/N ratio can be achieved.

Because the output signal level is doubled, the length of the silicon resonator can be shortened to half. Therefore, the sensing element can be miniaturized.

When the resonator can be miniaturized, miniaturization of the sensor chip is enabled. Therefore, it is possible to provide a silicon resonant type pressure sensor which enables the production cost of the sensor chip to be reduced.

The miniaturized element enables the mass ratio of the resonator and the diaphragm to be increased, so that a silicon resonant type pressure sensor which is less affected by spurious can be realized.

The miniaturized element enables a measuring instrument which uses the element to be miniaturized, and a silicon resonant type pressure sensor in which the production cost is expected to be largely reduced can be realizsed.

Furthermore, since the detection vibrating beam connecting portion is fabricated in the connecting beam portion, the portions can be formed simultaneously in a semiconductor fabrication process. Therefore, a low cost silicon resonant type pressure sensor can be provided.

Furthermore, the vibrating beam body is made of a silicon material. A silicon is a marketable material and can be economically obtained. Therefore, an economical silicon resonant type pressure sensor can be provided.

Since the driving vibrating beam portion is electrically isolated from the detection vibrating beam portions by an isolation layer or a PN junction, a silicon resonant type pressure sensor in which the crosstalk level is reduced can be provided.

The driving vibrating beam portion is formed by doping boron or phosphorus into the vibrating beam body. Therefore, it is possible to provide an economical silicon resonant type pressure sensor in which a semiconductor process can be easily used, and insulation from the detection vibrating beam portions can be readily realized by the PN junction.

The detection vibrating beam portions are fabricated by doping boron or phosphorus into the vibrating beam body. Therefore, it is possible to provide an economical silicon resonant type pressure sensor in which a semiconductor manufacturing process can be easily used, and isolated from the driving vibrating beam portion can be readily realized by the PN junction.

The first and the second vibrating beams are vibrated in reversed phase each other. Therefore, it is possible to provide a silicon resonant type pressure sensor in which noises existing in phase in the two beams can be easily cancelled out by differential coupling, and a doubled output signal level can be easily obtained.

DETAILED DESCRIPTION OF THE PREFERRED EMBODIMENTS

An embodiment of the invention will be described in detail with reference to the accompanying drawings.

Figure 1:
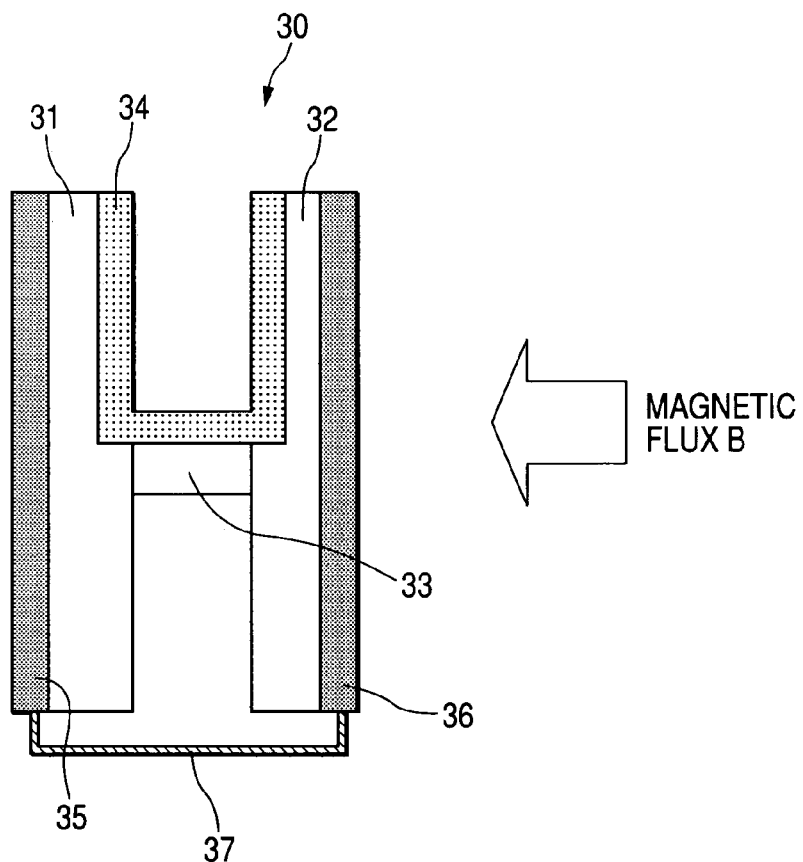
FIG. 1 is a diagram illustrating the configuration of main portions of an embodiment of the invention.
Figure 2:
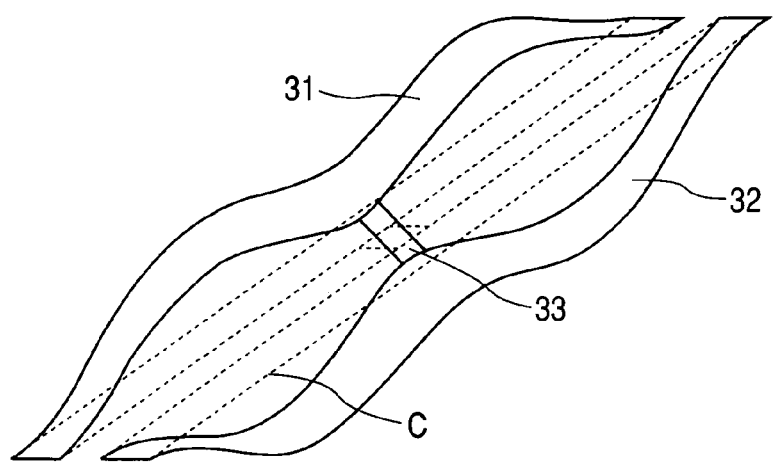
FIG. 2 is a diagram illustrating the vibration mode of the resonator.

FIG. 1 is a diagram illustrating the configuration of main portions of an embodiment of the invention, and FIG. 2 is a diagram illustrating the vibration mode of the resonator.

Referring to the figures, a vibrating beam body 30 has the first and the second vibrating beams 31, 32, and a connecting beam portion 33.

The first and second vibrating beams 31, 32 are allocated in parallel each other.

The at least one connecting beam portion 33 couples the first vibrating beam 31 and the second vibrating beam 32 each other.

A driving vibrating beam portion 34 is fabricated on a side of at least one side face in the axial direction of the first and second vibrating beams 31, 32, and made of a conductor.

Detection vibrating beam portions 35, 36 are fabricated on sides of another side face in the axial direction of the first and second vibrating beams 31, 32, respectively.

A detection vibrating beam connecting portion 37 electrically connects one end of the first detection vibrating beam portion to that of the second detection vibrating beam portion.

In this case, the vibrating beam body 30 is made of a silicon material.

The vibrating beam body 30 is embedded on the sensing diaphragm 2 via an insulating layer (not shown). In this case, a silicon di oxide film is used as the insulating layer.

The driving vibrating beam portion 34 is electrically isolated from the detection vibrating beam portions 35, 36 by an isolation layer or a PN junction.

The driving vibrating beam portion 34 is formed by doped boron or phosphorus into the vibrating beam body 30.

The detection vibrating beam portions 35, 36 are formed by doped boron or phosphorus into the vibrating beam body 30.

In the thus configured H-shaped resonator, when an AC current is supplied to the driving vibrating beam portion 34, the detection vibrating beam portion 35 and the detection vibrating beam portion 36 generate induced electromagnetic forces in opposite phase, and, as shown in FIG. 2, the detection vibrating beam portion 35 and the detection vibrating beam portion 36 vibrate in opposite phase.

In FIG. 2, the dotted-lines show a quasi-static shape of a resonator.

The conductors of the resonator cross the magnetic fluxes, and hence AC induced electromagnetic output voltage are generated in the detection vibrating beam portion 35 and the detection vibrating beam portion 36.

When the detection vibrating beam connecting portion 37 is set as a reference, an electromagnetic output voltage of +E (or –E) is generated in the detection vibrating beam portion 35, and an electromagnetic output voltage of –E (or +E) is generated in the detection vibrating beam portion 36. In the case where the detection vibrating beam connecting portion 37 is set as a reference, electromagnetic output voltage in opposite phase are always generated in the detection vibrating beam portion 35 and the detection vibrating beam portion 36, respectively.

When electromagnetic output voltages are taken out from a configuration of "the detection vibrating beam portion 35–the detection vibrating beam portion 36," +E–(–E)=2E is obtained. As compared with the case where the vibrating beam portion 35 is used as an input and the vibrating beam portion 36, therefore, a doubled output voltage can be taken out even at the same length of the resonator.

As a result, the invention can attain the following advantages.

The detection vibrating beam portions 35, 36 can be made twice in length as compared with the related art example. Therefore, it is possible to provide a silicon resonant type pressure sensor in which the output voltage of a resonator can be doubled.

Since the output voltage can be increased, it is possible to provide a silicon resonant type pressure sensor having an enhanced S/N ratio.

When the output voltage is doubled, the length of the resonator can be shortened to half. Therefore, the sensing element can be miniaturized.

When the sensing element can be miniaturized, miniaturization of the sensor chip 1 is enabled. Therefore, it is possible to provide a silicon resonant type pressure sensor which enables the production cost of the sensor chip 1 to be reduced.

The miniaturized element enables the mass ratio of the resonator and the diaphragm 2 to be increased, so that a silicon resonant type pressure sensor which is less affected by spurious can be provided.

The miniaturized element enables a measuring instrument which uses the element to be miniaturized, and a silicon resonant type pressure sensor in which the production cost is expected to be largely reduced can be provided.

Since the detection vibrating beam connecting portion 37 which electrically connects the one end of the first detection vibrating beam portion 35 to that of the second detection vibrating beam portion 36 is fabricated, the total length of the detection vibrating beam portions 35, 36 is substantially two times the length in the related art example, and it is possible to provide a silicon resonant type pressure sensor in which the output level of a resonator can be doubled.

The vibrating beam body 30 is made of a silicon material, and a silicon material is marketable and can be easily obtained. Therefore, a low cost silicon resonant silicon resonant type pressure sensor can be provided.

Since the driving vibrating beam portion 34 is electrically isolated from and the detection vibrating beam portions 35, 36 by an isolation layer or a PN junction, a silicon resonant type pressure sensor in which the crosstalk level is reduced can be provided.

The driving vibrating beam portion 34 is formed by doped boron or phosphorus into the vibrating beam body 30. Therefore, it is possible to provide a low cost silicon resonant type pressure sensor in which a semiconductor process can be easily used.

The detection vibrating beam portions 35, 36 are formed by doped boron or phosphorus into the vibrating beam body 30. Therefore, it is possible to provide a low cost economical silicon resonant type pressure sensor in which a semiconductor process can be easily used.

Since the vibrating beam body 30 is disposed on the sensing diaphragm 2 via the insulator layer, the resonator and the diaphragm 2 are isolated from each other by the insulator layer. Therefore, it is possible to provide a silicon resonant type pressure sensor in which the driving current does not leak to the diaphragm 2.

An oxidation silicon film is used as the insulator layer. Since the oxidation silicon film is easily used in the semiconductor process, it is possible to provide a low cost silicon resonant type pressure sensors.

The first and second vibrating beams 31, 32 vibrate in opposite phase each other. Therefore, it is possible to provide a silicon resonant type pressure sensor in which noises can be easily cancelled out by differential coupling, and a doubled output level can be easily obtained.

Figure 3:
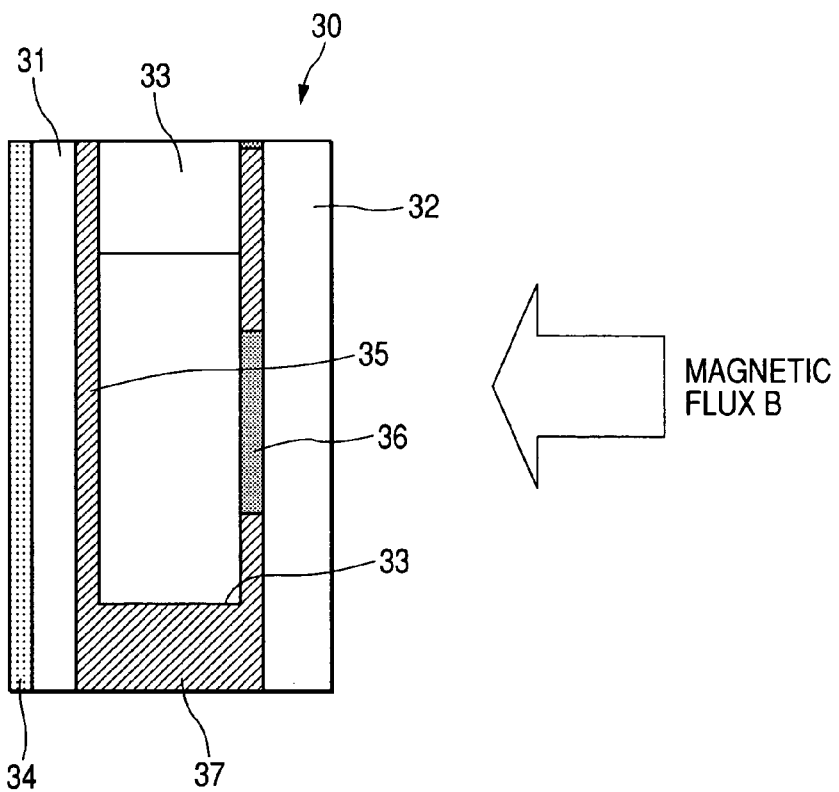
FIG. 3 is a diagram illustrating the configuration of main portions of another embodiment of the invention.

FIG. 3 is a diagram illustrating the configuration of main portions of another embodiment of the invention.

In the embodiment, the detection vibrating beam connecting portion 37 is fabricated in the connecting beam portion 33.

Since the detection vibrating beam connecting portion 37 is disposed in the connecting beam portion 33, the portions can be formed simultaneously in a semiconductor manufacturing process. Therefore, a low cost silicon resonant type pressure sensor can be provided.

Figure 4:
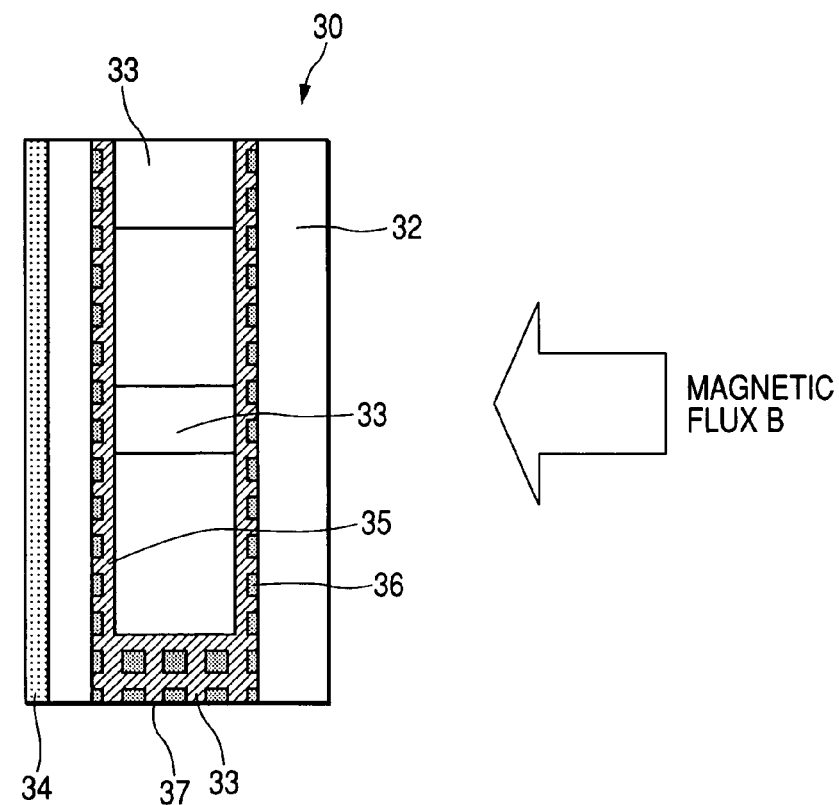
FIG. 4 is a diagram illustrating the configuration of main portions of a further embodiment of the invention.

FIG. 4 is a diagram illustrating the configuration of main portions of a further embodiment of the invention.

In the embodiment, three connecting beam portions 33 are fabricated.

Figure 5:
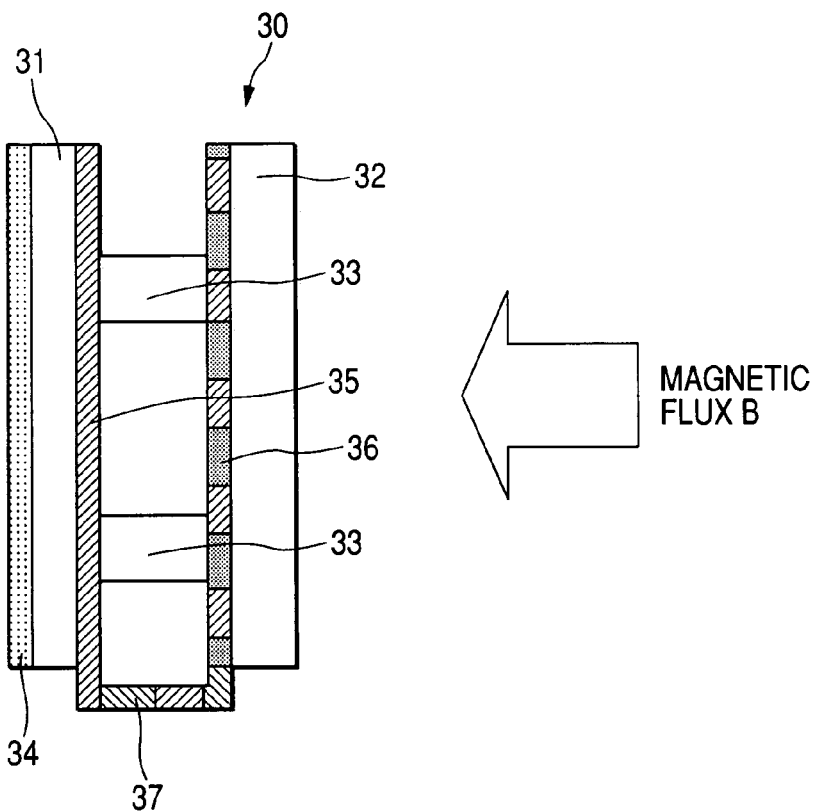
FIG. 5 is a diagram illustrating the configuration of main portions of a still further embodiment of the invention.

FIG. 5 is a diagram illustrating the configuration of main portions of a still further embodiment of the invention.

In the embodiment, two connecting beam portions 33 are fabricated at intermediate positions in a longitudinal direction.

Figure 6:
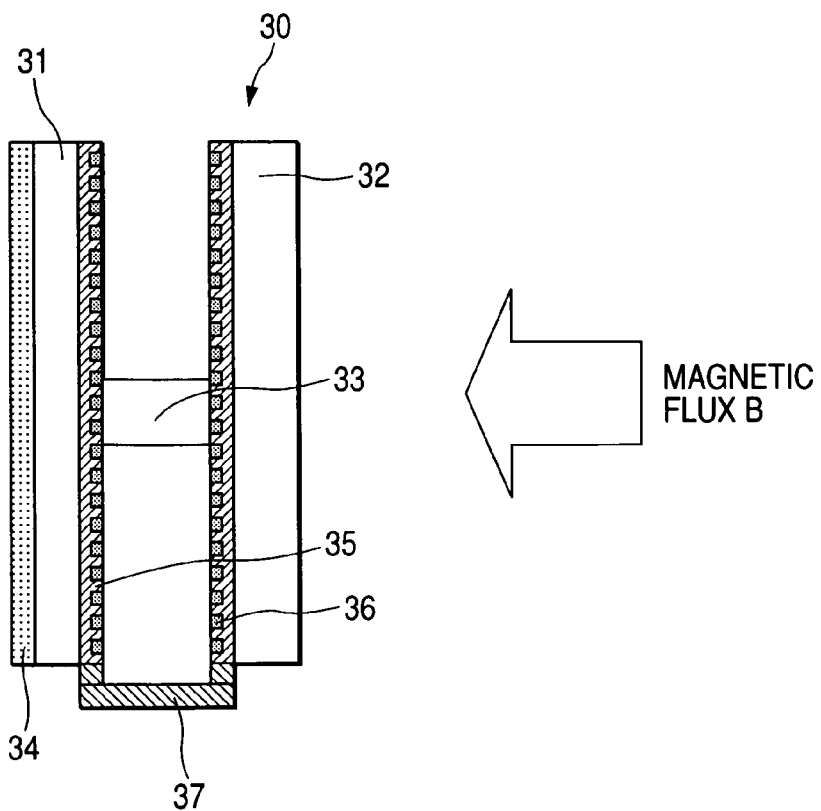
FIG. 6 is a diagram illustrating the configuration of main portions of a still further embodiment of the invention.

FIG. 6 is a diagram illustrating the configuration of main portions of a still further embodiment of the invention.

In the embodiment, one connecting beam portion 33 is disposed at an intermediate position in a longitudinal direction.

Figure 7:
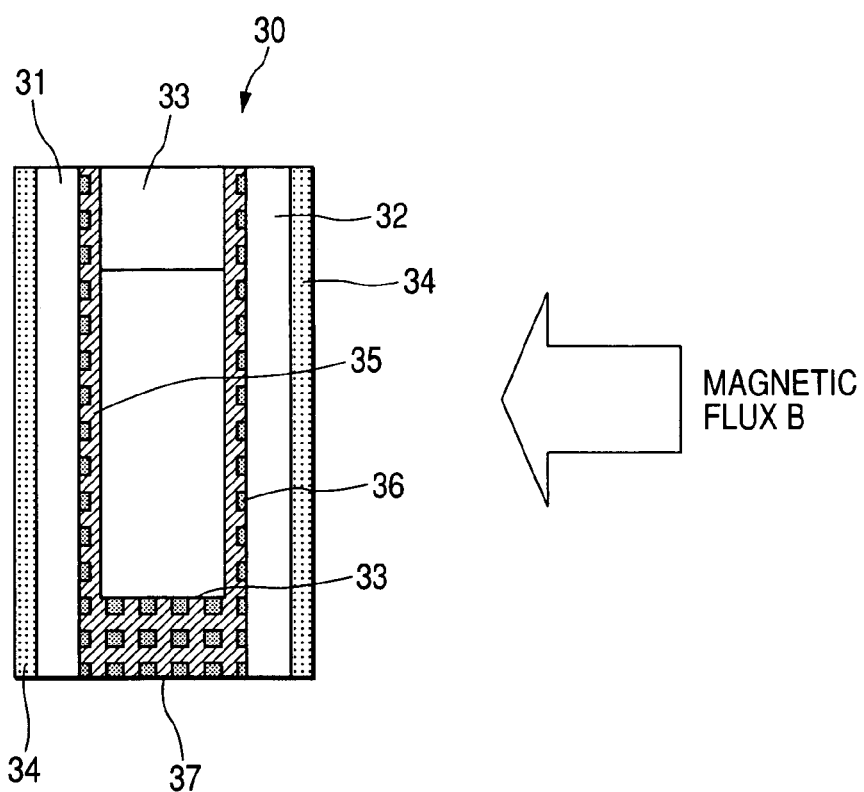
FIG. 7 is a diagram illustrating the configuration of main portions of a still further embodiment of the invention.
Figure 8:
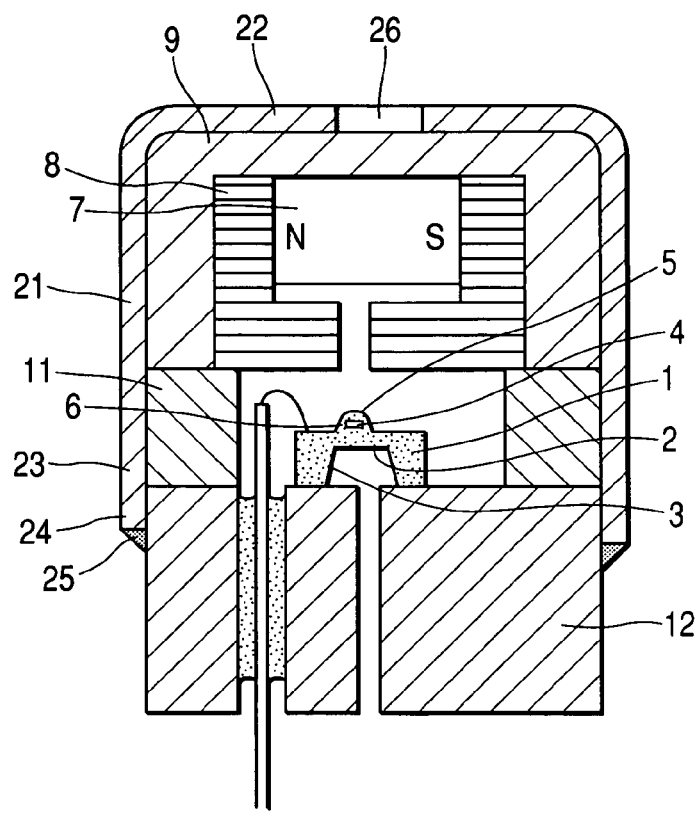
FIG. 8 is a diagram illustrating the configuration of main portions of an example of a related silicon resonant type pressure sensor.
Figure 9:
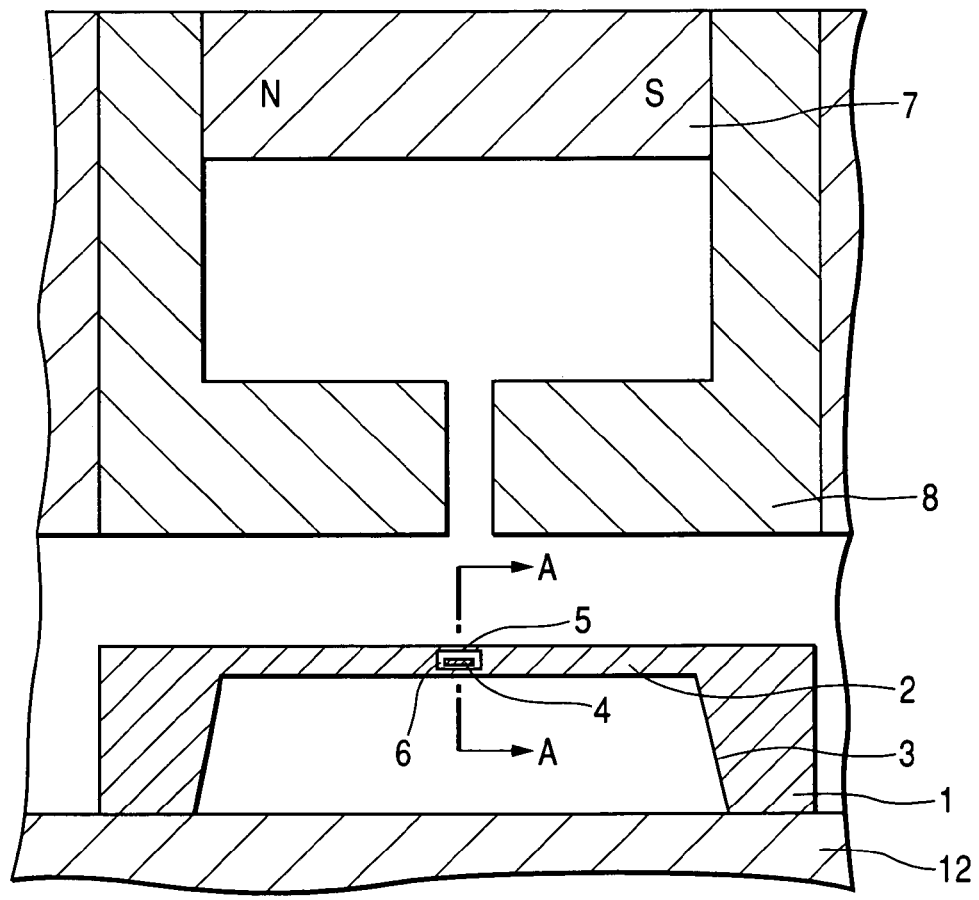
FIG. 9 is an enlarged detail view of main portions of FIG. 8.
Figure 10:
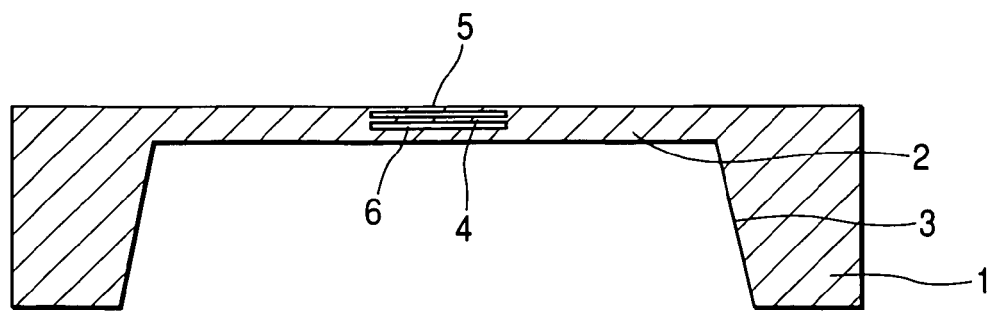
FIG. 10 is an enlarged detail view of the silicon sensor chip of FIG. 9.
Figure 11:
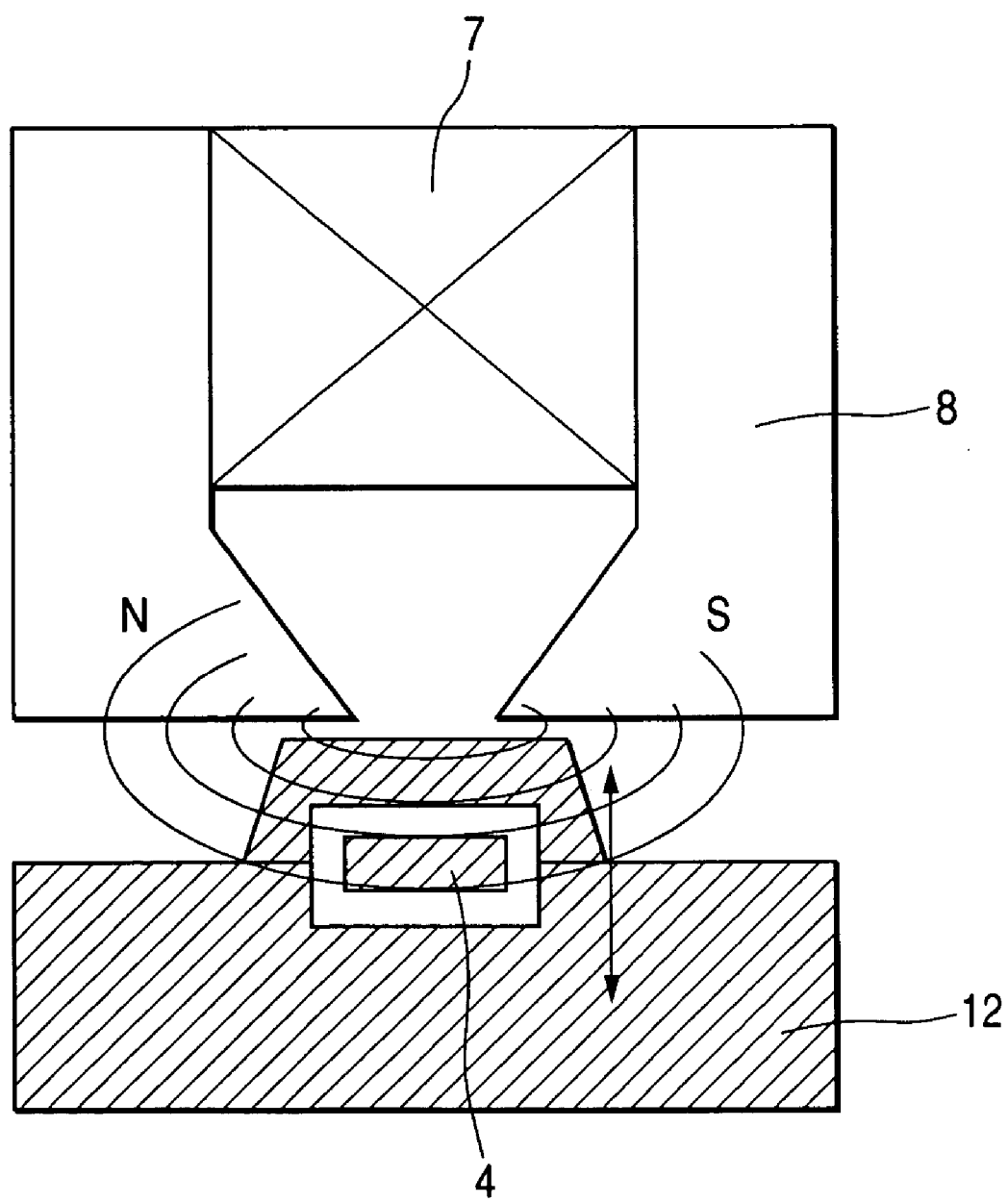
FIG. 11 is a diagram illustrating the cross-section of a silicon resonator and the operation of FIG. 8.
Figure 12:
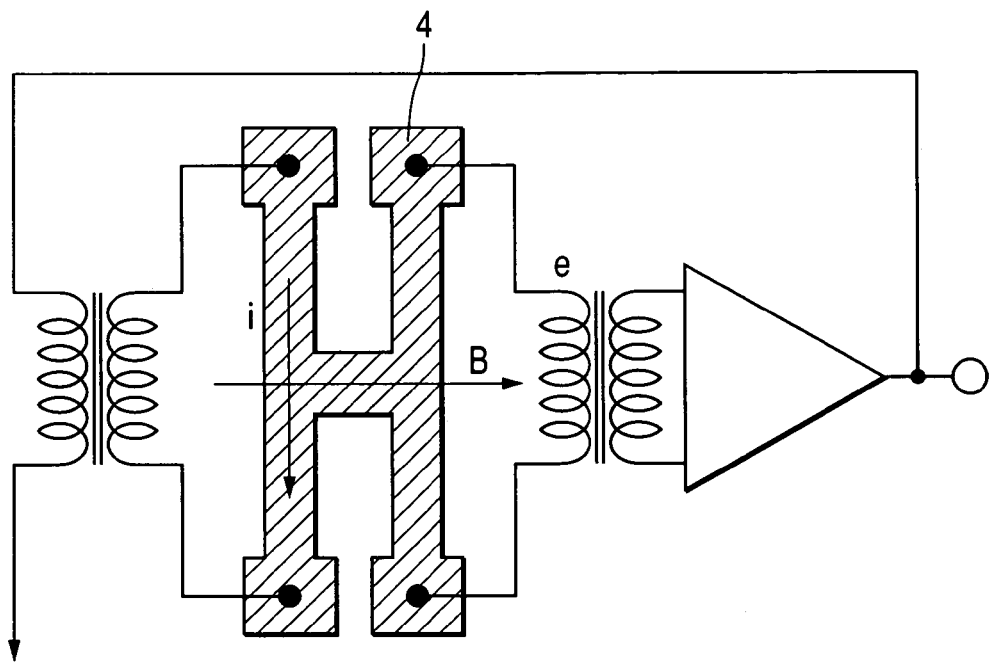
FIG. 12 is a diagram illustrating the operating principle of FIG. 8.
Figure 13:
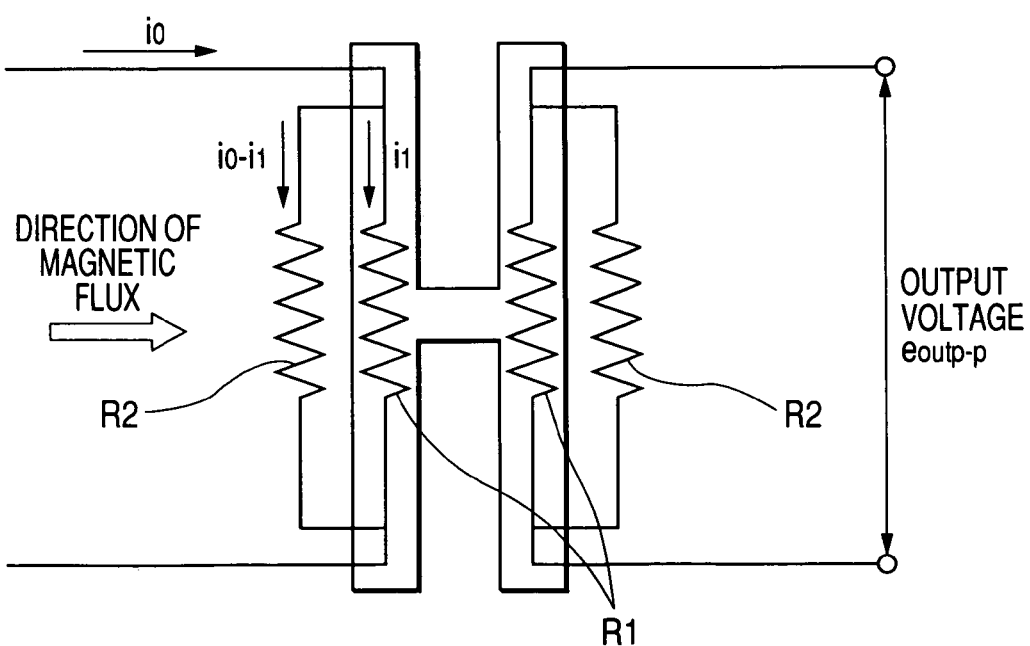
FIG. 13 is a schematic circuit diagram of a silicon resonator of FIG. 12.

FIG. 7 is a diagram illustrating the configuration of main portions of a still further embodiment of the invention.

In the embodiment, the driving vibrating beam portion 34 is fabricated in each of the first and second vibrating beams.

The above description shows only specific preferred embodiments for the purposes of illustration and exemplification of the invention. Therefore, the invention is not limited to the embodiments, and includes further changes and modifications without departing the spirit of the invention.

What is claimed is:

1. A silicon resonant type pressure sensor comprising:
   a sensing diaphragm to which a measuring pressure is to be applied; and
   a vibrating beam which is fabricated on the sensing diaphragm, and which is made of a semiconductor,
   wherein the vibrating beam further comprises:
   a vibrating beam body having first and second vibrating beams which are allocated in parallel each other, and at least one connecting beam portion which couples the first vibrating beam and the second vibrating beam;
   a driving vibrating beam portion which is fabricated on a side of at least one side face in an axial direction of the first and second vibrating beams, and which is made of a conductor; and
   detection vibrating beam portions which are fabricated on sides of another side face in the axial direction of the first and second vibrating beams respectively, and which are made of a conductor.

2. The silicon resonant type pressure sensor according to claim 1,
   wherein the vibrating beam further comprises a detection vibrating beam connecting portion which electrically connects one end of one detection vibrating beam portion to one end of another detection vibrating beam portion.

3. The silicon resonant type pressure sensor according to claim 2,
   wherein the detection vibrating beam connecting portion is fabricated in the connecting beam portion.

4. The silicon resonant type pressure sensor according to claim 1,
   wherein the vibrating beam body is made of a silicon material.

5. The silicon resonant type pressure sensor according to claim 1,
   wherein the driving vibrating beam portion is electrically isolated from the detection vibrating beam portions by an isolation layer or a PN junction.

6. The silicon resonant type pressure sensor according to claim 1,
   wherein the driving vibrating beam portion is formed by doped boron or phosphorus into the vibrating beam body.

7. The silicon resonant type pressure sensor according to claim 1,
   wherein the detection vibrating beam portions are formed by doped boron or phosphorus into the vibrating beam body.

8. The silicon resonant type pressure sensor according to claim 1,
   wherein the first and second vibrating beams are vibrated in reversed phase each other.

9. A vibrating beam comprising:
   a vibrating beam body having first and second vibrating beams which are allocated in parallel each other, and at least one connecting beam portion which couples the first vibrating beam and the second vibrating beam;
   a driving vibrating beam portion which is fabricated on a side of at least one side face in an axial direction of the first and second vibrating beams, and which is made of a conductor; and
   detection vibrating beam portions which are fabricated on sides of another side face in the axial direction of the first and second vibrating beams respectively, and which are made of a conductor.

* * * * *